US012809799B2

(12) United States Patent
Don et al.

(10) Patent No.: US 12,809,799 B2
(45) Date of Patent: Nov. 24, 2026

(54) SYSTEM AND METHOD FOR MANAGING INPUT-OUTPUT TIMEOUTS BASED ON DATA LOCATION

(71) Applicant: Dell Products L.P., Round Rock, TX (US)

(72) Inventors: Arieh Don, Newton, MA (US); Efi Levi, Beer Sheva (IL); Lior Benisty, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 18/758,046

(22) Filed: Jun. 28, 2024

(65) Prior Publication Data

US 2026/0003808 A1 Jan. 1, 2026

(51) Int. Cl.
*G06F 13/24* (2006.01)
*H04L 67/10* (2022.01)

(52) U.S. Cl.
CPC .............. *G06F 13/24* (2013.01); *H04L 67/10* (2013.01); *G06F 2213/2406* (2013.01)

(58) Field of Classification Search
CPC ... G06F 13/24; G06F 2213/2406; H04L 67/10
USPC ............................................................ 710/48
See application file for complete search history.

(56) References Cited

U.S. PATENT DOCUMENTS

| | | | | |
|---|---|---|---|---|
| 5,894,583 | A * | 4/1999 | Johnson | G06F 9/4825 714/48 |
| 6,526,433 | B1 * | 2/2003 | Chang | G06F 11/0709 709/224 |
| 9,614,939 | B2 * | 4/2017 | Mogul | G06F 9/547 |
| 10,187,478 | B2 * | 1/2019 | Prabhakar | H04L 63/20 |
| 10,291,555 | B2 * | 5/2019 | K | H04L 49/9094 |
| 10,592,119 | B2 * | 3/2020 | Candelaria | G06F 3/061 |
| 11,563,636 | B1 * | 1/2023 | Kairali | H04L 67/563 |
| 11,979,341 | B2 * | 5/2024 | Lifshitz | G06F 3/0604 |
| 2014/0244877 | A1 * | 8/2014 | Williamson | G06F 13/24 710/262 |
| 2015/0323956 | A1 * | 11/2015 | Goyal | G06F 11/0745 713/600 |
| 2024/0126641 | A1 | 4/2024 | Xu et al. | |

FOREIGN PATENT DOCUMENTS

JP 2017174038 A * 9/2017 ............ H04L 67/14

* cited by examiner

*Primary Examiner* — Pierre Vital
(74) *Attorney, Agent, or Firm* — WOMBLE BOND DICKINSON (US) LLP

(57) ABSTRACT

Methods and system for managing data in a distributed system are disclosed. To manage data in the distributed system, a host system may initiate an input-output (IO) transaction based on an occurrence of an IO transaction event being identified. The IO transaction may include storage commands to manage the data stored in a destination and/or to store the data in the destination. The IO transaction may have a dynamic timeout that defines a duration of time to receive confirmation of the IO transaction being processed by the destination prior to performing remedial processes by the host system.

20 Claims, 6 Drawing Sheets

SYSTEM AND METHOD FOR MANAGING INPUT-OUTPUT TIMEOUTS BASED ON DATA LOCATION

FIELD

Embodiments disclosed herein relate generally to user accessibility management. More particularly, embodiments disclosed herein relate to systems and methods to manage data in a distributed environment based on input-output timeouts.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
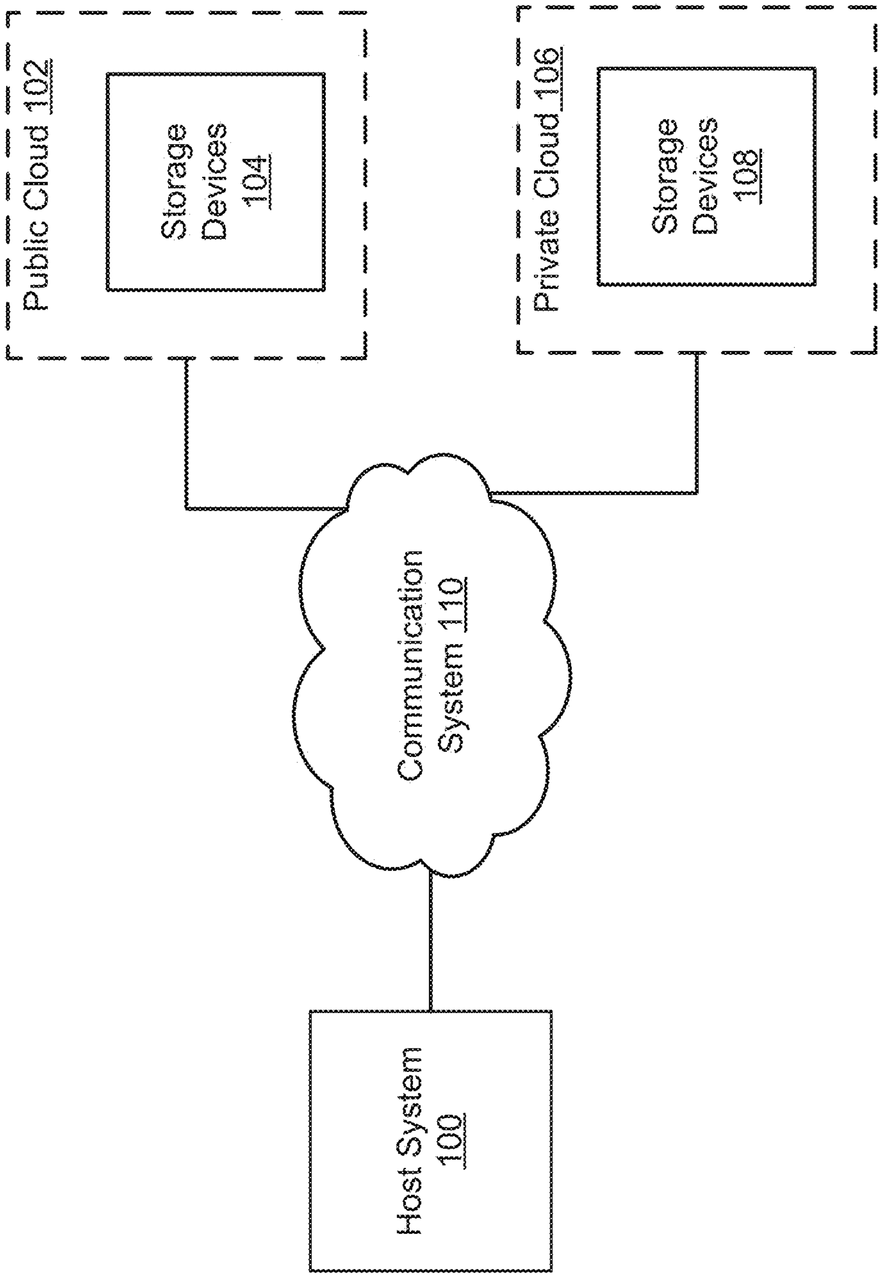
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiment disclosed herein relate to methods and systems for managing data in a distributed system. The distributed system may include any number of subsystems (e.g., host system, public cloud, private cloud, etc.) that may cooperatively provide computer-implemented services. Managing the data in the distributed system may include performing data storage operations for a portion of data stored and/or to be stored in a storage system of the distributed system. The data storage operations may include performing read commands, write commands deletion commands, etc. for a portion of the data. When the data storage operations are performed, a duration of time to complete the data storage operation may be limited based on a pre-determined amount of time.

For example, in the context of storing data in a public cloud (e.g., data processing systems remotely located from the device generating the data), a host system may initiate an input-output (IO) transaction (e.g., including storage command for the data) with the public cloud and wait a pre-determined amount of time (e.g., IO timeout) to receive a confirmation of processing the IO transaction from the public cloud. The host system may make a determination whether to perform remediation processes to resolve any potential issue with servicing the IO transaction by the storage system (e.g., public cloud) if the confirmation is not received within the pre-determined amount of time (e.g., IO timeout).

The IO timeout may be constant for all IO transactions regardless of the destination of the IO transaction (e.g., type of storage system). However, each IO transaction may be processed at different rates due to various factors that contribute to latency of servicing the IO transaction. Consequently, the ability of servicing IO transactions by different storage systems (e.g., public cloud, private cloud, etc.) may be negatively impacted and the likelihood of providing computer-implemented services based on the data managed via IO transactions may be decreased.

To manage IO transactions, a system in accordance with an embodiment may implement a dynamic timeout framework that adjusts the IO timeout used for IO transactions based on the destination of the IO transactions. To implement the dynamic timeout framework, different IO timeouts may be obtained for different IO destinations (e.g., different type of storage systems and/or devices). Once obtained, the IO timeouts may be stored in a data structure (e.g., within the host system) with each IO timeout being keyed to the corresponding destination.

Consequently, when the IO transaction is initiated by the host system, the host system may adjust the period of time (e.g., IO timeout) to wait to receive a confirmation of the IO transaction being serviced from the corresponding destination. For example, the destination of may be used as a key to identify the corresponding IO timeout to use in order to determine whether the IO transaction has failed or has been successful (e.g., whether the confirmation was received prior to the IO timeout).

By doing so, a system in accordance with embodiments disclosed herein may facilitate both management of data and performance of processes (IO transactions) that may rely on predetermined durations of time. Thus, embodiments disclosed herein may address, among other problems, the technical problem of data management in distributed systems where multiple entities may have different data processing systems which provide different IO transaction processing rates. By implementing IO timeouts based on destination of the IO transactions, the disclosed system may facilitate tailored data management services based on the data location.

In an embodiment, a method for managing data in a distributed system is disclosed. The method may include identifying, by a host system of the distributed system, an occurrence of an input-output (IO) transaction event; based on the occurrence: obtaining, by the host system, an IO transaction based on the IO transaction event; identifying, by the host system, a destination for the IO transaction; identifying, by the host system, a dynamic timeout based on the destination; initiating, by the host system, provisioning of the IO transaction to the destination; initiating, by the host system, a timer to measure time from when the provisioning of the IO transaction is initiated; making, by the host system and using the timer, a determination regarding whether a confirmation for the IO transaction is obtained from the destination prior to the measured time exceeding the dynamic timeout; in a first instance of the determination where the confirmation is not received prior to the measured time exceeding the dynamic timeout: treating the IO transaction as having failed; and in a second instance of the determination where the confirmation is received prior to the measured time exceeding the dynamic timeout: treating the IO transaction as having completed.

Identifying the dynamic timeout may include: performing a look up in a data structure using the destination as a key to identify the dynamic timeout for the destination.

The data structure may include entries corresponding to destinations, each of the destinations being adapted for data storage, and the data structure keying different ones of the destinations to different dynamic timeouts.

The destinations may include a private cloud destination and a public cloud destination.

The dynamic timeout of the dynamic timeouts keyed to the private cloud destination is based on an average IO response time for IO transaction from the host system, the average IO response time being an average time between when the host system initiates test IO transactions with the private cloud destination and when confirmations of processing of the test IO transactions are received from the private cloud destination.

The dynamic timeout of the dynamic timeouts may be keyed to the private cloud destination is further based on a service level IO response time commitment by an operator of the private cloud destination.

A dynamic timeout of the dynamic timeouts may be keyed to the public cloud destination is based on a maximum IO response time for IO transaction from the host system, the maximum IO response time being a maximum time between when the host system initiates test IO transactions with the private cloud destination and when confirmations of processing of the test IO transactions are received from the private cloud destination.

The dynamic timeout of the dynamic timeouts keyed to the public cloud destination is further based on a dynamic factor of safety that is based on a sampling of the IO response time for the IO transaction from the host system, the dynamic factor of safety being between 500 and 5000.

The method may further include: prior to identifying the occurrence: providing, by the host system and to the destination, at least one test IO request; initiating, by the host system, a second timer to measure time from when the at least one test IO request is provided to the destination; receiving, by the host system and from the destination, a confirmation in response to the at least one test IO request; obtaining, by the host system and based on the confirmation, the dynamic timeout for the destination; and storing the dynamic timeout in a data structure that is keyed to the destination.

Treating the IO transaction as having failed may include: initiating a new IO transaction for the IO transaction event.

The IO transaction may be associated with a portion of data stored at the destination, and the host system is adapted to track at which destination the portion of the data is stored as the portion of the data is migrated between destinations of the distributed system over time.

Each of the destinations may be operably connected to the host system via network connectivity.

Each of the destinations may provide data storage services to any number of host systems.

At least two of the destinations may include data processing systems that have different IO transaction processing rates.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system may provide any number and/or types of computer-implemented services (e.g., to the user of the system and/or devices operably connected to the system). The computer-implemented services may include, for example, data storage service, database services, data processing services, electronic communication services, etc. The computer-implemented services may be provided by, for example, host system 100, public cloud 102, storage devices 104, private cloud 106, storage devices 108, and/or any other type of devices (not shown in FIG. 1). Other types of computer-implemented services may be provided by the system shown in FIG. 1 without departing from embodiments disclosed herein.

To provide the computer-implemented services, host system 100 may include various hardware components (e.g., processors, memory modules, storage devices, etc.) and host various software components (e.g., operating systems, applications, startup managers such as basic input-output systems, etc.). These hardware and software components may provide the computer-implemented services via their operation.

The ability of host system 100 to provide the computer-implemented services may depend on the ability to store and retrieve stored data via completion of input-output (IO) transactions. For example, in a scenario in which a host system is providing database services using data stored in a public cloud, access to some of the stored data in the public cloud may be limited based on latency between initiation of an IO transaction from the host system and processing of the IO transaction by the public cloud which may prevent the database services from being provided.

When providing the computer-implemented services, data processing systems of public cloud 102 and/or private cloud 106 may store, access stored data, and/or otherwise manage data based on storage commands specified by IO transactions received from host system 100. The data may be, in part, stored in public cloud (e.g., 102) and/or private cloud (e.g., 106). The public cloud 102 and private cloud 106 may include any number of storage devices (e.g., storage devices 104 and storage devices 108, respectively) usable to store data.

To store and retrieve stored data, a host system (e.g., hardware and/or software components of the host system) may initiate performance of an input-output (IO) transaction with a destination (e.g., location of the data is stored and/or to be stored). The IO transaction may include performing an operation (e.g., IO request including storage commands) that transfers data to and/or from a storage system (e.g., the destination of the IO transaction) to a user or vice versa.

For example, an application hosted by host system 100 may initiate an IO transaction to obtain a copy of data stored in public cloud 102 in order to perform it's intended function (e.g., the desired computer-implemented services). In this scenario, the application may generate a high-level IO request such as "obtain a portion of data" and may communicate the high-level IO request with an operating system of host system 100. Once received, the operating system may translate the high-level IO request into a low level IO request (e.g., which would include a series of IO transactions).

For example, the operating system may read the metadata (e.g., associated with the portion of data) and use the metadata to reconstitute the data (e.g., via using bit patterns to identify block(s) in which the data (or portion of the data) are stored). The operating system may encapsulate the IO request (e.g., include encapsulation information) so that the IO request may be provided to the destination (e.g., public cloud 102 and/or private cloud 106) over a network (e.g., network connection previously established between the host system and the destination).

As part of performing IO transactions, host system 100 (e.g., hardware and/or software component of the host system) may monitor the duration of time in which a response (e.g., confirmation of processing the IO transaction) to a low-level IO request may be received from the storage device in order to identify issues with IO transactions (e.g., limited network connectivity, IO lost in transition, etc.) which may impact the IO from being serviced by the storage device. In an embodiment, the confirmation may include an acknowledgment indicating the operation was successfully completed by the destination (e.g., storage device). For example, host system 100 may define a maximum amount of time (e.g., IO timeout) to wait for an acknowledgement (e.g., a confirmation) of a successful completion of the IO in response to the IO request from the destination of the IO request (e.g., public cloud 102) until performing remediation processes to address potential issues with the IO request.

Host system 100 (e.g., more specifically the operating system of the host system) may have a constant IO timeout value for all IO transactions (e.g., regardless of the destination of the IO transactions). The constant IO timeout value may be used by host system 100 to determine whether the IO transaction has been successful (e.g., processed prior to the timeout) or failed (e.g., not processed before the timeout has been meet or exceeded). However, each IO transaction may be processed at different rates (e.g., rate of time) due to various factors that impact the latency of IO transactions (e.g., network latencies, data processing system latencies, etc.) For example, an amount of computing resources available for processing IO transactions by different destinations (e.g., storage systems such as public cloud 102 and/or private cloud 106) may contribute to the aggregate latency. Due to the constant timeout response, there may not be an adjustment for IO transactions with increased latency (e.g., longer processing times) and as such, the IO transaction may be determined a failure (e.g., unserviceable by the intended destination of the IO transaction) by host system. Consequently, host system 100 may prematurely perform remedial processes to manage the IO transactions and the likelihood of completion of the IO transactions directed to storage systems with higher IO response times may be decreased.

In general, embodiment disclosed herein may provide methods, systems, and/or devices for managing data in a distributed system. To manage data in the distributed system, host system 100 may manage IO transactions based on the destination of the IO transactions. Each of the destinations may have a corresponding IO timeout value tailored based on the performance/service level of the respective destination. Host system 100 may obtain the IO timeout value for each destination by providing test IO requests to the destinations and performing calculations using the IO response times for the test IO requests that were successfully completed. Host system 100 may dynamically adapt the IO timeout value for IO transactions by identifying the IO timeout value according to the destination of the IO transaction (e.g., data location). By doing so, the likelihood of premature termination of IO's directed to lower performing storage systems may be decreased while the aggregate latency for IO transactions may be used to manage and increase the efficiency of IO's being successfully completed.

To provide its functionality, host system 100 may (i) identify an occurrence of an IO transaction event, (ii) based on the occurrence, obtain an IO transaction based on the IO transaction event, (iii) identify a destination for the IO transaction, (iv) identify a dynamic timeout based on the destination, (v) initiating, by the host system, provisioning of the IO transaction to the destination, (vi) initiate a timer to measure time from when the provisioning of the IO transaction is initiated, (vii) make, using the timer, a determination regarding whether a confirmation for the IO transaction is obtained from the destination prior to the measured time exceeding the dynamic timeout, and/or (viii) based on the determination, treat the IO transaction as having failed or completed.

To identify the dynamic timeout for an IO transaction, host system 100 may utilize the destination of the IO transaction as key to perform a look up using a data structure in which each destination is keyed to an IO timeout value. To obtain the IO timeout value for the destinations, host system 100 may provide test IO requests to each destination and utilize the IO response time for the test IO requests to perform tailored calculations based on the destination type (e.g., public cloud 102 and/or private cloud 106).

For example, the dynamic timeout corresponding to public cloud 102 may be based on a maximum IO response time for an IO transaction and a dynamic factor of safety that is based on a sampling of the IO response time for the IO transaction. For example, host system 100 may provide test IO requests to public cloud 102 and based on the confirmations (e.g., acknowledgements of the operations being successfully completed) received in response to the test IO requests, host system 100 may identify the maximum IO response time and multiply it by a factor of 5000 (e.g., the dynamic factor of safety) to obtain the dynamic timeout for public cloud 102. The dynamic factor of safety may be used to adjust the dynamic timeout for public cloud 102 based on whether the dynamic timeout is met during provisioning of IO transactions. For example, host system 100 may continuously monitor the dynamic timeout and determine to reduce the dynamic timeout by a factor of 1000 (e.g., maximum IO response time multiplied by 4000) to obtain a new dynamic timeout for public cloud 102.

The dynamic timeout for private cloud 106 may be based, for example, on an average of IO response time for an IO transaction and on a service level IO response time commitment by an operator of the private cloud (e.g., 106). For example, host system 100 may provide test IO requests to private cloud 106 and based on the confirmations received in response to the test IO requests, host system 100 may obtain an average of the IO response times (e.g., average time between the host system initiating test IO requests with the private cloud and receiving confirmations of processing the test IO requests from the private cloud).

To facilitate the computer-implemented services, public cloud 102 may participate in IO transaction management services provided in cooperation with host system 100. To do so, public cloud 102 may (i) obtain IO requests from host system 100, (ii) perform storage commands for data as specified by IO requests, (iii) based on completion of processing the IO requests, provide confirmations in response to the IO requests to host system 100, and/or (iv) perform other processes to facilitate execution of IO transactions with host system 100 (and/or other host systems).

Private cloud 106 may also participate in IO transaction management services in cooperation with host system 100. When participating in the IO transaction management services, private cloud 106 (and/or storage devices 108) may (i) obtain IO requests from host system 100, (ii) perform storage commands for data as specified by IO requests, (iii) based on completion of processing the IO requests, provide confirmations in response to the IO requests to host system 100, and/or (iv) perform other processes to facilitate execution of IO transactions with host system 100 (and/or other host systems). For example, the IO requests may be obtained by receiving the IO from host system 100, which may send and initiate the sending of the IO request to the destination (e.g., private cloud 106).

Figure 3:
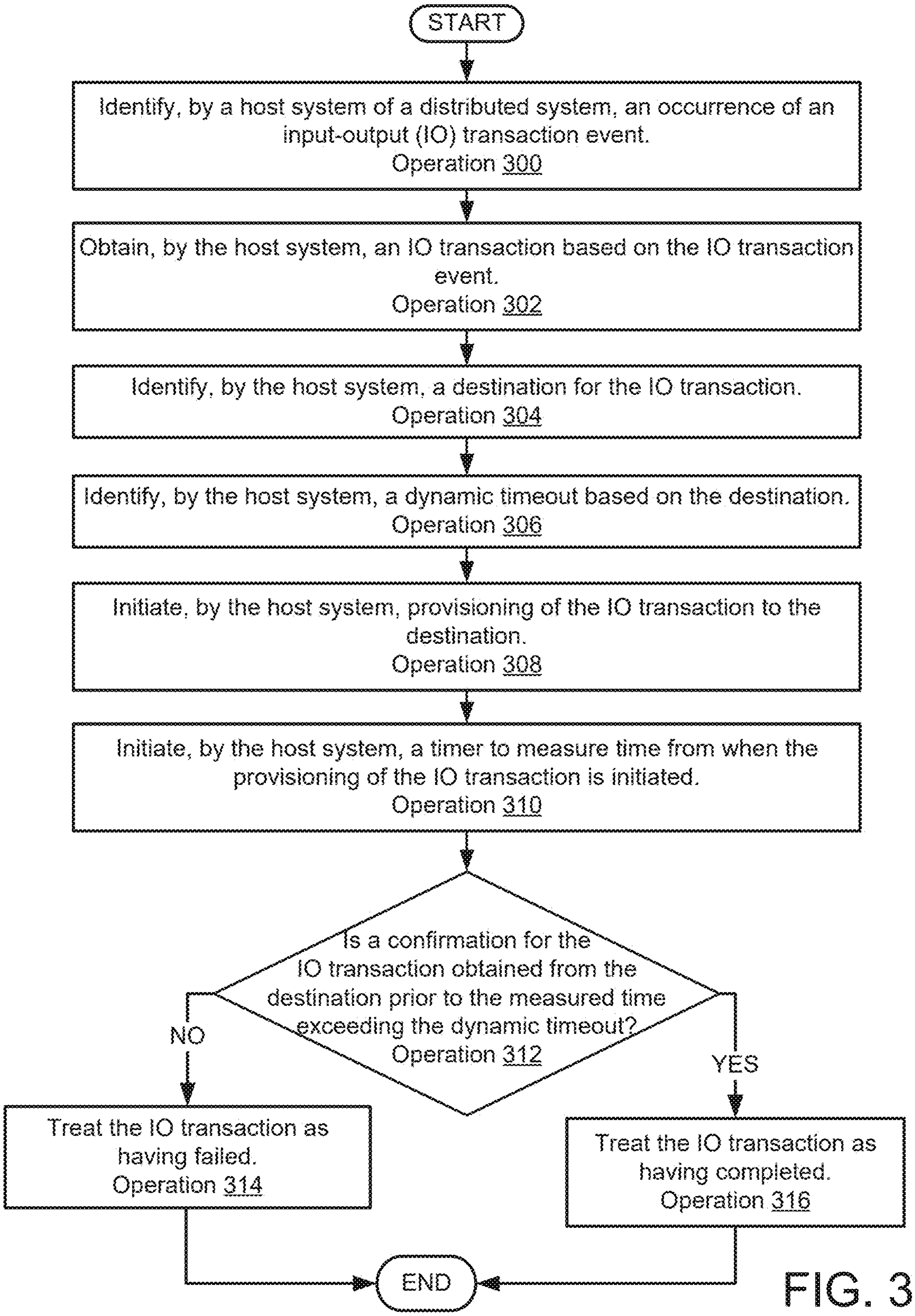
FIG. 3 shows a flow diagram illustrating a method of managing data in a distributed system to provide computer implemented services in accordance with an embodiment.

When providing its functionality, host system 100, public cloud 102, and/or private cloud 106 may perform all, or a portion, of the method and/or actions shown in FIG. 3.

Host system 100, public cloud 102, and/or private cloud 106 may be implemented using a computing device such as a host or server, a personal computer (e.g., desktops, laptops, and tablets), a “thin” client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

In an embodiment, one or more of host system 100, public cloud 102, and/or private cloud 106 are implemented using an internet of things (IoT) device, which may include a computing device. The IoT device may operate in accordance with a communication model and/or management model known to host system 100, public cloud 102, and/or private cloud 106, data sources (not shown), and/or other devices.

Any of the components illustrated in FIG. 1 may be operably connected to each other (and/or components not illustrated) with a communication system 110. In an embodiment, communication system 110 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
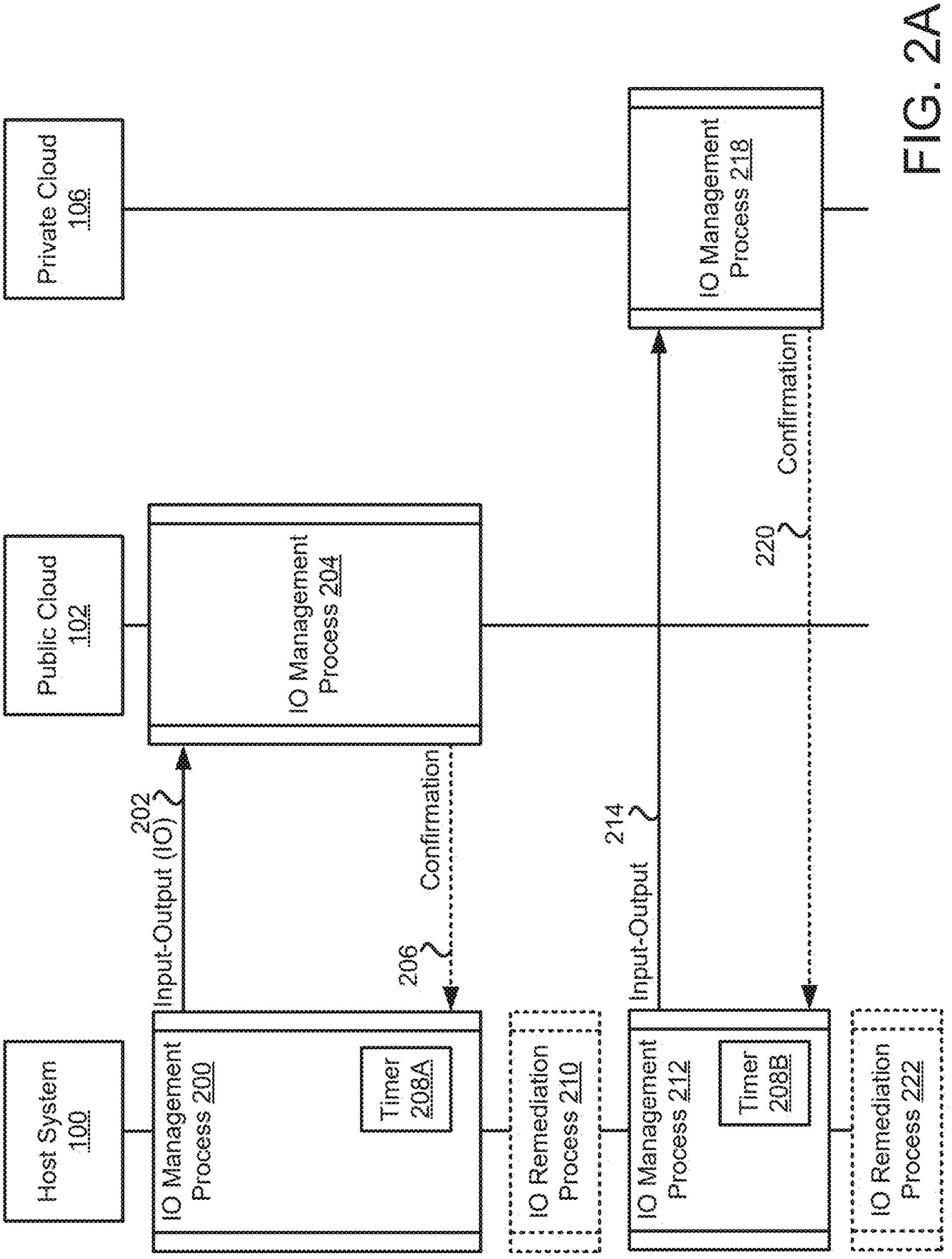
FIGS. 2A-2C show diagrams illustrating data flows in accordance with an embodiment.
Figure 2B:
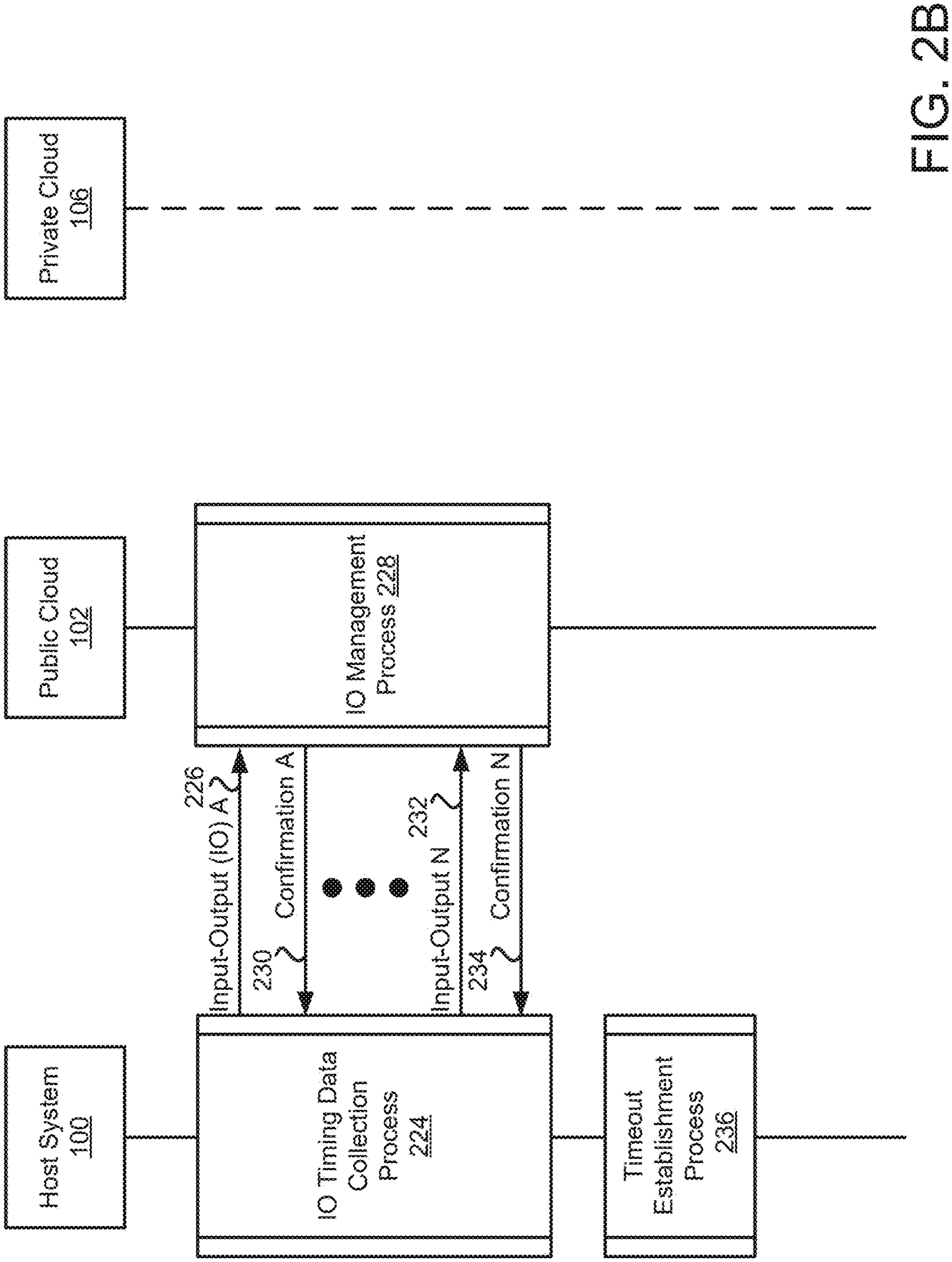
Figure 2C:
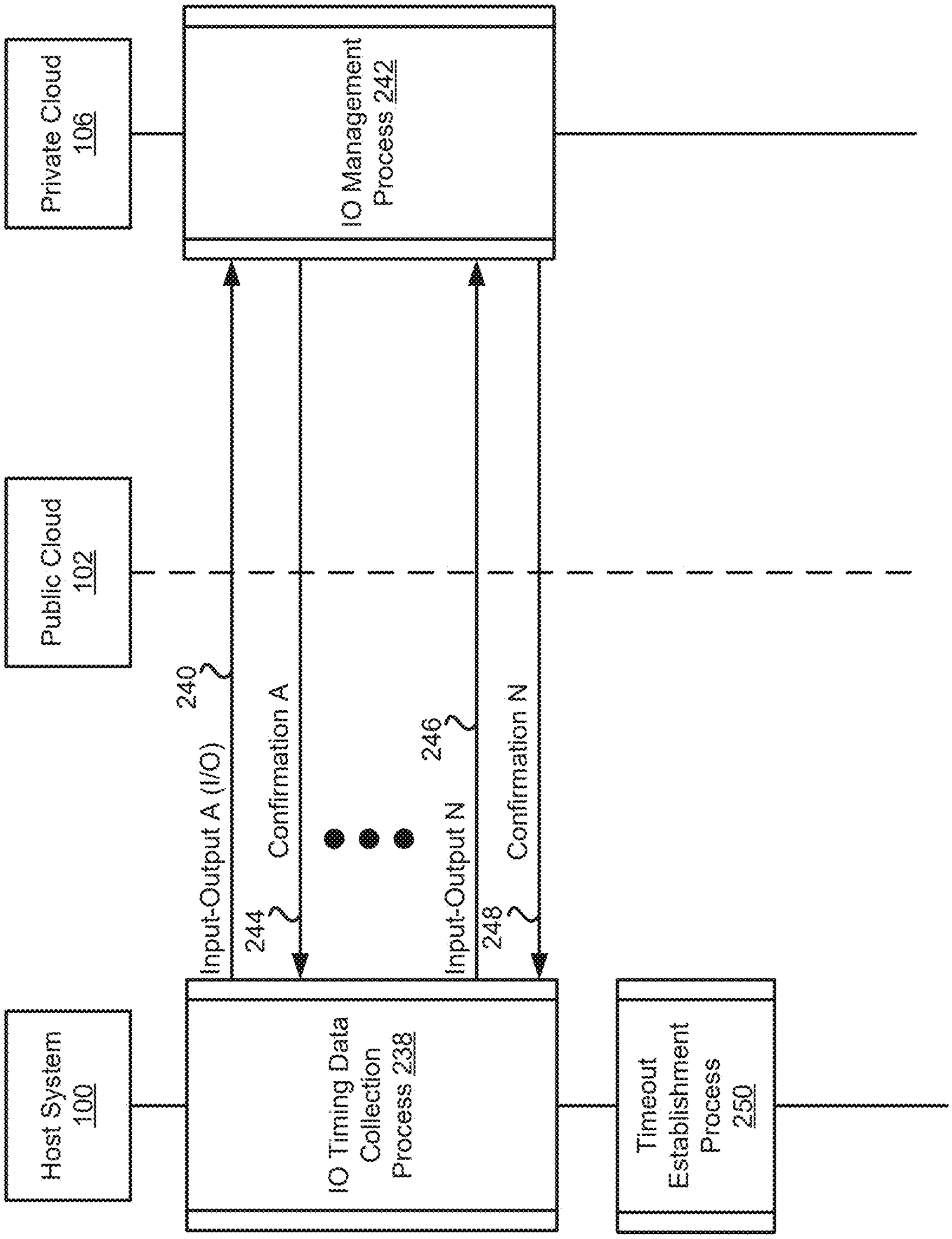

To further clarify embodiments disclosed herein, interactions diagrams in accordance with an embodiment are shown in FIGS. 2A-2C. These interactions diagrams may illustrate how data may be obtained and used within the system of FIG. 1.

In the interaction diagrams, processes performed by and interactions between components of a system in accordance with an embodiment are shown. In the diagrams, components of the system are illustrated using a first set of shapes (e.g., 100, 102, etc.), located towards the top of each figure. Lines descend from these shapes. Processes performed by the components of the system are illustrated using a second set of shapes (e.g., 200, 204, etc.) superimposed over these lines. Interactions (e.g., communication, data transmissions, etc.) between the components of the system are illustrated using a third set of shapes (e.g., 202, 206, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 214 may occur prior to the interaction labeled as 220. However, it will be appreciated that the processes and interactions may be performed in different orders, any may be omitted, and other processes or interactions may be performed without departing from embodiments disclosed herein.

The lines extending between the second set of shapes (e.g., 202, 204, etc.) is drawn in dashing to indicate, for example, that the corresponding interactions may not occur in the operation of the system for various reasons.

The lines descending from some of the first set of shapes (e.g., 102, 106, etc.) is drawn in dashing to indicate, for example, that the corresponding components may not be (i) operable, (ii) powered on, (iii) present in the system, and/or (iv) not participating in operation of the system for other reasons.

Turning to FIG. 2A, a first interaction diagram in accordance with an embodiment is shown. The first interaction diagram may illustrate processes and interactions that may occur during management of IO transactions based on data destinations.

To manage IO transactions based on data destinations, host system 100 may perform IO management process 200. During IO management process 200, an IO transaction event may occur and based on the occurrence, an IO transaction may be initiated. IO transaction may include hardware components and/or software resources of host system 100 communicating with one another regarding management of data stored within a destination. Management of the data may include actions such as write, read, deletion of the data. The IO transaction may include encapsulation information that may enable the IO to be provided over a network to the targeted destination (e.g., public cloud 102 and/or private cloud 106).

At interaction 202, input-output (IO) may be initiated by host system 100 and provided to public cloud 102. The IO may be provided via (i) transmission via a message, (ii) storing in a storage with subsequent retrieval by public cloud 102, (iii) via publish-subscribe system where public cloud 102 subscribes to updates from host system 100 thereby causing a copy of the IO to be propagated to public cloud 102, and/or via other processes. As part of interaction 202, a timer (e.g., timer 208A) may be initiated to measure time from when the provisioning of the IO is initiated (e.g., by host system 100).

Once obtained, public cloud 102 may use the IO to perform IO management process 204. During IO management process 204, the IO may be processed by public cloud 102 which may include various data management processes as specified by the IO. For example, the IO request may include a write command for storing a portion of data in public cloud 102. Public cloud 102 may service the IO transaction by performing the write command and storing the portion of data for future access and use by host system 100 (e.g., user of host system 100).

At interaction 206, confirmation may be generated and provided to host system 100 by public cloud 102. The confirmation may be provided via (i) transmission via a message, (ii) storing in a storage with subsequent retrieval by host system, (iii) via publish-subscribe system where host system 100 subscribes to updates from public cloud 102 thereby causing a copy of the IO to be propagated to host system 100, and/or via other processes.

Once the confirmation is received, host system 100 may treat the IO transaction as having completed. For example, if the IO transaction included storing a portion of data in public cloud 102, host system 100 may delete a local copy of the portion of data (e.g., local disk drive of host system 100) once the confirmation of the processed IO transaction is received from public cloud 102.

In some instances, the confirmation (e.g., at interaction 206) may not be received from public cloud 102 by host system 100 within the dynamic timeout (e.g., duration of time allotted for IO transactions for public cloud 102). In those instances, host system 100 may make a determination that the IO transaction as having failed (e.g., the IO transaction could not be serviced by public cloud 102).

To facilitate remediation of this failed IO transaction, IO remediation process 210 may be performed. During IO remediation process 210, host system 100 may perform various processes to remediate the failure of the IO. For example, host system 100 may generate a new IO, provide the new IO to public cloud 102, and/or perform any other similar processes to address the issue with the IO. Refer to FIG. 2B for additional details on obtaining a dynamic timeout for IO transactions associated with public cloud as the destination.

In a second instance of managing IO transaction based on data destinations, IO management process 212 may be performed to manage IO transactions directed to a private cloud (e.g., private cloud 106).

During IO management process 212, host system 100 may identify private cloud 106 as the destination (e.g., location of the data in which the IO transaction is regarding) of the IO transaction. As part of IO management process 212, host system 100 may initiate the IO transaction by identifying a dynamic timeout for IO transaction associated with private cloud 106 and generating a data package with the IO request (e.g., input-output). Host system 100 may then initiate a timer (e.g., timer 208B) to measure the duration of time from when provisioning of the IO transaction was initiated and compare the measured time to the dynamic timeout associated with the private cloud. Refer to FIG. 2C for additional details on obtaining a dynamic timeout for IO transactions associated with a private cloud as the destination.

The first instance of managing IO transactions for public cloud destinations (e.g., IO management process 200 and/or IO management process 204) may have longer IO timeout in comparison to IO transactions for private cloud destinations (e.g., IO management process 212 and/or IO management process 218) which may have a short IO timeout. To represent the different duration of time in which host system 100 performs IO management processes, the size of the second set of shapes (e.g., representing IO management processes) may vary according to the IO timeout associated with each of the destinations (e.g., public cloud 102 and/or private cloud 106).

At interaction 214, an input-output may be provided to private cloud 106 by host system 100. The IO may include storage commands such as read command, write command, deletion commands, etc. When the IO is obtained by private cloud 106, the private cloud (and/or storage devices of the private cloud) may process the IO. For example, in response to write commands, private cloud 106 may store data.

In response to receiving the IO, private cloud 106 may perform IO management process 218. During IO management process 218, private cloud 106 (and/or storage devices of the private cloud) may process the IO by executing the request regarding the data for which the IO is directed. For example, if the IO includes write commands regarding a portion of data, private cloud 106 may store the portion of data in response to the write commands.

If private cloud 106 successfully processes the IO during IO management process 218, at interaction 220, a confirmation may be generated and provided to host system 100 by private cloud 106. The confirmation may be provided via a network connection between host system 100 and private cloud 106.

In response to receiving the confirmation, host system 100 may make a determination whether the confirmation for the IO is obtained from the destination (e.g., private cloud 106) prior to the measured time (e.g., via timer 208B) exceeding the dynamic timeout associated with the destination (e.g., private cloud 106). If the confirmation was received (e.g., by host system 100) prior to the measured time exceeding the dynamic timeout for private cloud 106, host system 100 may treat the IO transaction as being completed (e.g., IO was successfully processed by private cloud 106).

Conversely, if the confirmation was not received (e.g., by host system 100) prior to the measured time exceeding the dynamic timeout for private cloud 106, host system 100 may treat the IO transaction as having failed (e.g., issue with IO being processed by private cloud 106). In the instance where host system 100 determines the IO transaction has failed, host system 100 may perform IO remediation process 222.

During IO remediation process 222, host system 100 may perform various remedial type of processes to remediate the issue with the IO transaction. For example, host system 100 may re-drive (e.g., reissue) the IO request and modify (e.g., by increasing) the IO timeout allotted for private cloud 106, thereby eliminating potentially, minor time restraints for processing IO timeouts by private cloud 106. As an additional example, host system 100 may generate a new IO for the IO transaction and provide the new IO to private cloud 106 (e.g., similar to interaction 214). The result of performing remediation process 222 may be successfully servicing the IO transaction by private cloud 106 and therefore, managing data as desired to provide the computer-implemented services.

Turning to FIG. 2B, a second interaction diagram in accordance with an embodiment is shown. The second interaction diagram may illustrate processes and interactions that may occur during obtaining an IO timeout associated with public cloud destinations.

To obtain the IO timeout associated with public cloud destinations, host system 100 may initiate performance of IO timing data collection process 224. During IO timing data collection process 224, host system 100 may initiate a series of test IO requests to provide to the destination (e.g., public cloud 102). For example, host system 100 may generate one or more IO's (e.g., input-output A-input-output N) at different points in time.

At interaction 226, input-output A may be provided to public cloud 102 (and/or storage devices of the public cloud 102) from host system 100. The input-output A may include storage commands such as read commands, write commands, deletion commands, etc. for a portion of data.

In response to receiving the input-output A, public cloud 102 may perform IO management process 228. During IO management process 228, public cloud 102 may manage the input-output A by performing the process specified by the input-output A.

If the input-output A is processed successfully, at interaction 230, confirmation A is generated and provided to host system 100 by public cloud 102. The confirmation A may indicate the input-output A has been processed by public cloud 102. For example, if the input-output A includes a write command for a portion of data, the confirmation A may indicate the portion of data is stored by public cloud 102.

In response to receiving the confirmation A, host system 100 may stop the timer (e.g., associated with input-output A) to obtain an IO response time (e.g., measured duration of time between initiating provisioning of the input-output A and receiving the confirmation A) for the input-output A. The IO response time for input-output A may be temporarily stored by host system 100 (e.g., an operating system of the host system).

At interaction 232, input-output N may be generated and provided to public cloud 102 by host system 100. The input-output N may be provided to public cloud 102 using a network connection established between host system 100 and public cloud 102.

In response to receiving the input-output N, public cloud 102 may perform IO management process 228. During IO management process 228, public cloud 102 may manage the input-output N by performing the process specified by the input-output N.

If the input-output N is processed successfully, at interaction 234, confirmation N is generated and provided to host system 100 by public cloud 102. The confirmation N may indicate the input-output N has been processed by public cloud 102. For example, if the input-output N includes a write command for a portion of data, the confirmation N may indicate the portion of data is stored by public cloud 102.

In response to receiving the confirmation N, host system 100 may stop the timer (e.g., associated with input-output N) to obtain an IO response time (e.g., measured duration of time between initiating provisioning of the input-output N and receiving the confirmation N) for the input-output N. The IO response time for input-output N may be temporarily stored by host system 100 (e.g., an operating system of the host system).

Once obtained, host system 100 may perform timeout establishment process 236. During timeout establishment process 236, host system 100 may utilize the IO response time for each IO request successfully processed by the destination (e.g., public cloud 102) to identify a maximum of the IO response time to obtain the IO timeout for public cloud 102.

The result of performing timeout establishment process 236 may be an IO timeout for IO transactions associated with public cloud destinations (e.g., public cloud 102). The IO timeout for a public cloud destination may be stored in a data structure in a searchable format. The IO timeout keyed to the public cloud destination (e.g., public cloud 102) may be based on a dynamic factor of safety that is based on a sampling of the IO response time for the IO transaction from the host system. The dynamic factor of safety may include a range between 500 and 5000 with adjustments performed by increments of 1000.

Turning to FIG. 2C, a third interaction diagram in accordance with an embodiment is shown. The third interaction diagram may illustrate processes and interactions that may occur during management of IO transactions based on data destinations.

To obtain the IO timeout associated with public cloud destinations, host system 100 may initiate performance of IO timing data collection process 224. During IO timing data collection process 224, host system 100 may initiate a series of test IO requests to provide to the destination (e.g., public cloud 102). For example, host system 100 may generate one or more IO's (e.g., input-output A-input-output N) at different points in time.

At interaction 226, input-output A may be provided to public cloud 102 (and/or storage devices of the public cloud 102) from host system 100. The input-output A may include storage commands such as read commands, write commands, deletion commands, etc. for a portion of data.

In response to receiving the input-output A, public cloud 102 may perform IO management process 228. During IO management process 228, public cloud 102 may manage the input-output A by performing the process specified by the input-output A.

If the input-output A is processed successfully, at interaction 230, confirmation A is generated and provided to host system 100 by public cloud 102. The confirmation A may indicate the input-output A has been processed by public cloud 102. For example, if the input-output A includes a write command for a portion of data, the confirmation A may indicate the portion of data is stored by public cloud 102.

In response to receiving the confirmation A, host system 100 may stop the timer (e.g., associated with input-output A) to obtain an IO response time (e.g., measured duration of time between initiating provisioning of the input-output A and receiving the confirmation A) for the input-output A. The IO response time for input-output A may be temporarily stored by host system 100 (e.g., an operating system of the host system).

At interaction 232, input-output N may be generated and provided to public cloud 102 by host system 100. The input-output N may be provided to public cloud 102 using a network connection established between host system 100 and public cloud 102.

In response to receiving the input-output N, public cloud 102 may perform IO management process 228. During IO management process 228, public cloud 102 may manage the input-output N by performing the process specified by the input-output N.

If the input-output N is processed successfully, at interaction 234, confirmation N is generated and provided to host system 100 by public cloud 102. The confirmation N may indicate the input-output N has been processed by public cloud 102. For example, if the input-output N includes a write command for a portion of data, the confirmation N may indicate the portion of data is stored by public cloud 102.

In response to receiving the confirmation N, host system 100 may stop the timer (e.g., associated with input-output N) to obtain an IO response time (e.g., measured duration of time between initiating provisioning of the input-output N and receiving the confirmation N) for the input-output N. The IO response time for input-output N may be temporarily stored by host system 100 (e.g., an operating system of the host system).

Once obtained, host system 100 may perform timeout establishment process 250. During timeout establishment process 250, host system 100 may utilize the IO response time for each IO request successfully processed by the destination (e.g., private cloud 106) to generate an average of the IO response time to obtain the IO timeout for private cloud 106.

The result of performing timeout establishment process 250 may be an IO timeout for IO transactions associated with private cloud destinations (e.g., private cloud 106). The IO timeout for a private cloud destination may be stored in a data structure in a searchable format. The IO timeout keyed to the private cloud destination (e.g., private cloud 106) may be based on a service level IO response time commitment by an operator of the private cloud destination. For example, an operator and/or user of private cloud 106 may select a high service level IO response time which may include use of multiple servers dedicated to performing workflows initiated by the operator and/or user. Conversely, if the operator and/or user of private cloud 106 selects a low service level IO response time, workflows initiated by the operator and/or user may be performed in a slower manner (e.g., larger duration of time).

Turning to FIG. 3, a flow diagram illustrating a method of managing data in a distributed system in accordance with an embodiment is shown. The method may be performed by any of host system 100, public cloud 102, storage devices 104, private cloud 106, storage devices 108, and/or other entities without departing from embodiments disclosed herein.

Prior to operation 300, the host system (and/or component of the host system) may obtain a dynamic timeout for each destination (e.g., public cloud destination, private cloud destination, and/or any other destinations). To obtain the dynamic timeout for a destination, host system may (i) provide at least one test IO request to the destination, (ii) initiate a second timer to measure time from when the at least one test IO request is provided to the destination, (iii) receive, from the destination, a confirmation in response to the at least one test IO request, (iv) obtain, based on the confirmation, the dynamic timeout for the destination, and/or (v) store the dynamic timeout in a data structure that is keyed to the destination.

At operation 300, an occurrence of an input-output (IO) transaction event may be identified by a host system of a distributed system. The occurrence of the IO transaction event may be identified by (i) receiving user input indicating initiation of an application hosted by the host system, (ii) generation by an application hosted by the host system, and/or (iii) performing any other methods.

At operation 302, an IO transaction may be obtained based on the IO transaction event. The IO transaction may be obtained via (i) generation by an application of the host system, (ii) generation based on user input by a user of the host system, and/or (iii) any other methods. For example, for IO transactions obtained via generation by an application of the host system, the application may initiate the IO by virtue of program code execution (e.g., application is operating and generating data that needs to be stored and/or the application may require access to data stored within a private cloud and/or public cloud in order to provide the application's function).

At operation 304, a destination for the IO transaction may be identified. The destination may be identified by (i) obtaining the destination from an external device, (ii) reading the destination from storage, and/or (iii) performing any other methods. Identifying the destination via reading the destination from storage, for example, may be performed by performing a look up in a data structure using data (for which the IO transaction is regarding) as a key to identify the location of the stored data (e.g., the destination).

At operation 306, a dynamic timeout based on the destination may be identified. Identifying the dynamic timeout may include: (i) performing a look up in a data structure using the destination as a key to identify the dynamic timeout for the destination, (ii) performing a look up in a data structure using the destination as a key to identify a formula associated with destination and computing the dynamic timeout using the formula and IO response time for the portion of data, and/or (iii) performing any other methods. For example, to identify the dynamic timeout via performing a look up, the host system may At operation 308, provisioning of the IO transaction to the destination may be initiated by the host system. Provisioning of the IO transaction may be initiated by (i) generating an IO request (e.g., any storage command such as write command, read command, etc.), (ii) packing the IO request into a data package, (iii) providing the data package to the destination via a network connecting the host system and the destination, and/or (iv) performing any other methods.

At operation 310, a timer may be initiated to measure time from when the provisioning of IO transaction is initiated. The timer may be initiated by (i) obtaining a signal from the operating system that indicates that the provisioning of the IO transaction is initiated, (ii) receiving a notification from a user via user input, and/or (iii) any other methods.

At operation 312, a determination may be made regarding whether a confirmation for the IO transaction is obtained from the destination prior to the measured time exceeding the dynamic timeout. The determination may be made by (i) obtaining the confirmation from the destination, (ii) comparing the measured time and the dynamic timeout, and/or (iii) performing other methods.

If it is determined that the confirmation for the IO transaction is obtained from the destination prior to the measured time exceeding the dynamic timeout (e.g., the determination is "Yes" at operation 312), then the method may proceed to operation 316.

At operation 316, the IO transaction may be treated as having completed. The IO transaction may be treated as having completed by (i) releasing the IO transaction by the host system, (ii) providing a notification to a user of the host system of the completion of the IO transaction, and/or (iii) performing any other methods. The method may end following operation 316.

Returning to operation 312, if it is determined that the confirmation for the IO transaction is not obtained from the destination prior to the measured time exceeding the dynamic timeout (e.g., the determination is "No" at operation 312), then the method may proceed to operation 314. At operation 314, the IO transaction may be treated as having failed. Treating the IO transaction as having failed may include initiating a new IO transaction for the IO transaction event. To initiate the new IO transaction for the IO transaction event may include (i) performing a reset of the IO transaction, (ii) obtaining a new IO transaction, (iii) providing the new IO transaction to the destination, and/or (iv) performing any other methods.

The method may end following operation 314.

Figure 4:
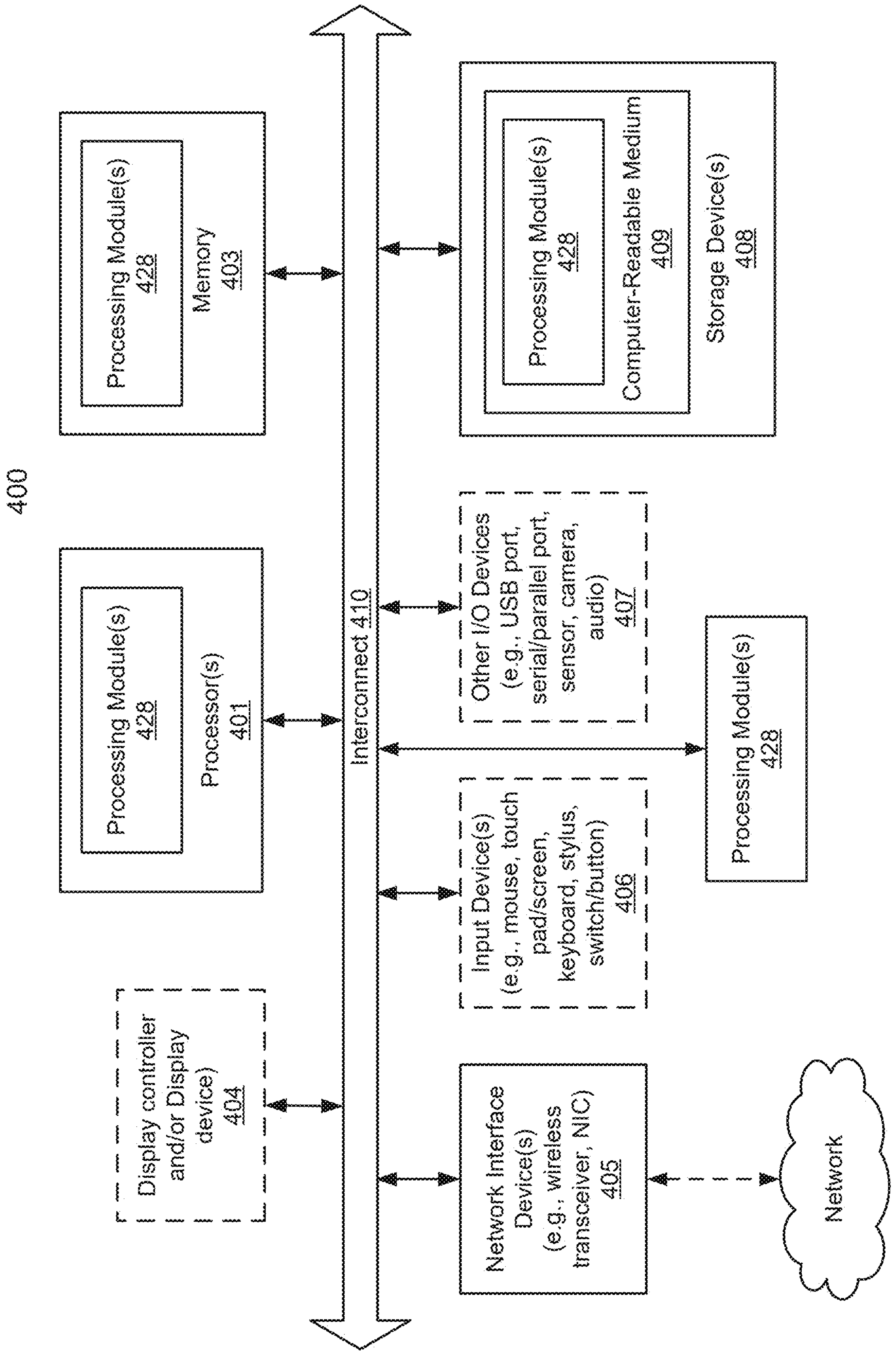
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data in a distributed system, the method comprising:

identifying, by a host system of the distributed system, an occurrence of an input-output (IO) transaction event;

based on the occurrence:

obtaining, by the host system, an IO transaction based on the IO transaction event;

identifying, by the host system, a destination for the IO transaction;

identifying, by the host system, a dynamic timeout based on the destination, wherein a value of the dynamic timeout changes based on a type of the destination;

initiating, by the host system, provisioning of the IO transaction to the destination;

initiating, by the host system, a timer to measure time from when the provisioning of the IO transaction is initiated;

making, by the host system and using the timer, a determination regarding whether a confirmation for the IO transaction is obtained from the destination prior to the measured time exceeding the dynamic timeout, the determination being made based on one or more interactions between the host system and the destination, one of the one or more interactions being a publish-subscribe system between the host system and the destination where the host system subscribes to public updates published by the destination, and the public updates comprise the confirmation;

in a first instance of the determination where the confirmation is not received prior to the measured time exceeding the dynamic timeout:

treating the IO transaction as having failed; and in a second instance of the determination where the confirmation is received prior to the measured time exceeding the dynamic timeout:

treating the IO transaction as having completed.

2. The method of claim 1, wherein identifying the dynamic timeout comprises:

performing a look up in a data structure using the destination as a key to identify the dynamic timeout for the destination.

3. The method of claim 2, wherein the data structure compromises first entries corresponding to destinations and second entries corresponding to dynamic timeouts, each of the destinations being adapted for data storage, and the data structure associating different ones of the destinations to different ones of the dynamic timeouts.

4. The method of claim 3, wherein the destinations comprise a private cloud destination and a public cloud destination.

5. The method of claim 4, wherein a dynamic timeout of the dynamic timeouts keyed to the private cloud destination is based on an average IO response time for IO transaction from the host system, the average IO response time being an average time between when the host system initiates test IO transactions with the private cloud destination and when confirmations of processing of the test IO transactions are received from the private cloud destination.

6. The method of claim 5, wherein the dynamic timeout of the dynamic timeouts keyed to the private cloud destination is further based on a service level IO response time commitment by an operator of the private cloud destination.

7. The method of claim 5, further comprising:

prior to identifying the occurrence:

providing, by the host system and to the destination, at least one test IO request;

initiating, by the host system, a second timer to measure time from when the at least one test IO request is provided to the destination;

receiving, by the host system and from the destination, a confirmation in response to the at least one test IO request;

obtaining, by the host system and based on the confirmation, the dynamic timeout for the destination; and storing the dynamic timeout in the data structure that is keyed to the destination.

8. The method of claim 4, wherein the dynamic timeout of the dynamic timeouts keyed to the public cloud destination is calculated by multiplying a maximum IO response time between the host system and the public cloud destination by a dynamic factor of safety, the maximum IO response time between the host system and the public cloud destination being obtained during a sampling of IO response times between the host system and the public cloud destination that is performed by the host system via the host system transmitting test IO requests to the public cloud destination.

9. The method of claim 8, wherein the dynamic factor of safety is a multiplier for the maximum IO response time between the host system and the public cloud destination, the dynamic factor of safety is set as a value between 500 and 5000 with 500 being a minimum value for the dynamic factor of safety and 5000 being a maximum value for the dynamic factor of safety, the dynamic factor of safety is adjusted by increments of 1000 to an adjusted one of the dynamic factor of safety based on a monitoring, by the host system, of the sampling of IO response times between the host system and the public cloud destination, and when the dynamic factor of safety is adjusted during the sampling of IO response times between the host system and the public cloud destination, the dynamic timeout of the dynamic timeouts keyed to the public cloud destination is calculated by multiplying the maximum IO response time between the host system and the public cloud destination by the adjusted one of the dynamic factor of safety.

10. The method of claim 1, wherein treating the IO transaction as having failed comprises:

initiating a new IO transaction for the IO transaction event.

11. The method of claim 1, wherein the IO transaction is associated with a portion of data stored at the destination, and the host system is adapted to track at which destination the portion of the data is stored as the portion of the data is migrated between destinations of the distributed system over time.

12. The method of claim 11, wherein each of the destinations are operably connected to the host system via network connectivity.

13. The method of claim 12, wherein each of the destinations provide data storage services to any number of host systems.

14. The method of claim 13, wherein at least two of the destinations comprise data processing systems that have different IO transaction processing rates.

15. A non-transitory machine-readable medium having instructions stored therein, which when executed by a processor, cause the processor to perform operations for managing data in a distributed system, the operations comprising:

identifying, by a host system of the distributed system, an occurrence of an input-output (IO) transaction event;

based on the occurrence:

obtaining, by the host system, an IO transaction based on the IO transaction event;

identifying, by the host system, a destination for the IO transaction;

identifying, by the host system, a dynamic timeout based on the destination, wherein a value of the dynamic timeout changes based on a type of the destination;

initiating, by the host system, provisioning of the IO transaction to the destination;

initiating, by the host system, a timer to measure time from when the provisioning of the IO transaction is initiated;

making, by the host system and using the timer, a determination regarding whether a confirmation for the IO transaction is obtained from the destination prior to the measured time exceeding the dynamic timeout, the determination being made based on one or more interactions between the host system and the destination, one of the one or more interactions being a publish-subscribe system between the host system and the destination where the host system subscribes to public updates published by the destination, and the public updates comprise the confirmation;

in a first instance of the determination where the confirmation is not received prior to the measured time exceeding the dynamic timeout:

treating the IO transaction as having failed; and in a second instance of the determination where the confirmation is received prior to the measured time exceeding the dynamic timeout:

treating the IO transaction as having completed.

16. The non-transitory machine-readable medium of claim 15, wherein identifying the dynamic timeout comprises:

performing a look up in a data structure using the destination as a key to identify the dynamic timeout for the destination.

17. The non-transitory machine-readable medium of claim 16, wherein the data structure compromises entries corresponding to destinations, each of the destinations being adapted for data storage, and the data structure associating different ones of the destinations to different dynamic timeouts.

18. A data processing system, comprising:

a processor; and a memory coupled to the processor to store instructions, which when executed by the processor, cause the processor to perform operations for managing data in a distributed system, the operations comprising:

identifying, by a host system of the distributed system, an occurrence of an input-output (IO) transaction event;

based on the occurrence:

obtaining, by the host system, an IO transaction based on the IO transaction event;

identifying, by the host system, a destination for the IO transaction;

identifying, by the host system, a dynamic timeout based on the destination, wherein a value of the dynamic timeout changes based on a type of the destination;

initiating, by the host system, provisioning of the IO transaction to the destination;

initiating, by the host system, a timer to measure time from when the provisioning of the IO transaction is initiated;

making, by the host system and using the timer, a determination regarding whether a confirmation for the IO transaction is obtained from the destination prior to the measured time exceeding the dynamic timeout, the determination being made based on one or more interactions between the host system and the destination, one of the one or more interactions being a publish-subscribe system between the host system and the destination where the host system subscribes to public updates published by the destination, and the public updates comprise the confirmation;

in a first instance of the determination where the confirmation is not received prior to the measured time exceeding the dynamic timeout:

treating the IO transaction as having failed; and in a second instance of the determination where the confirmation is received prior to the measured time exceeding the dynamic timeout:

treating the IO transaction as having completed.

19. The data processing system of claim 18, wherein identifying the dynamic timeout comprises:

performing a look up in a data structure using the destination as a key to identify the dynamic timeout for the destination.

20. The data processing system of claim 19, wherein the data structure compromises entries corresponding to destinations, each of the destinations being adapted for data storage, and the data structure associating different ones of the destinations to different dynamic timeouts.

* * * * *